(No Model.) 2 Sheets—Sheet 1.
W. B. GEDDES.
MACHINE FOR WINDLASSING AND TRUSSING BARRELS.
No. 437,686. Patented Oct. 7, 1890.
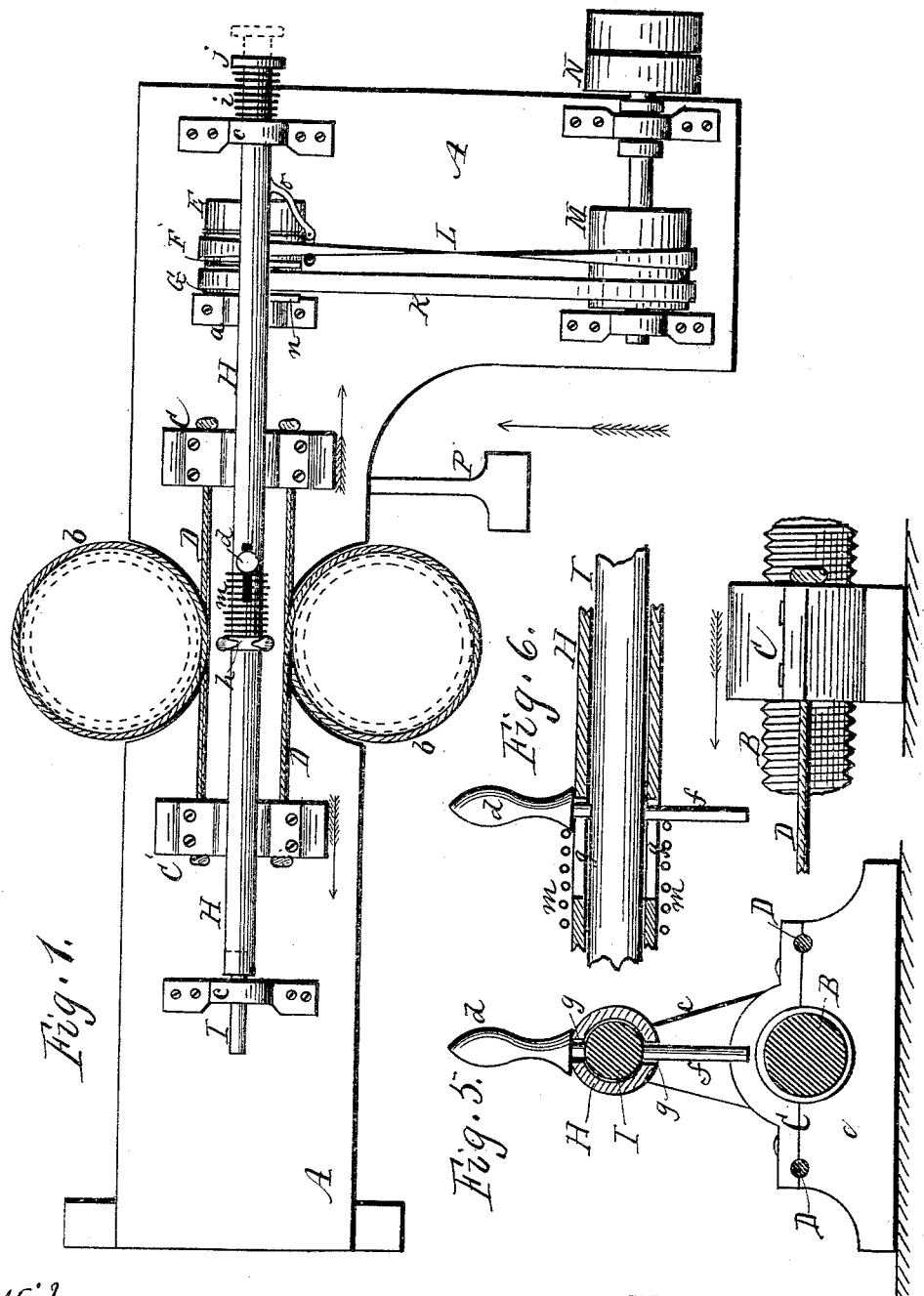

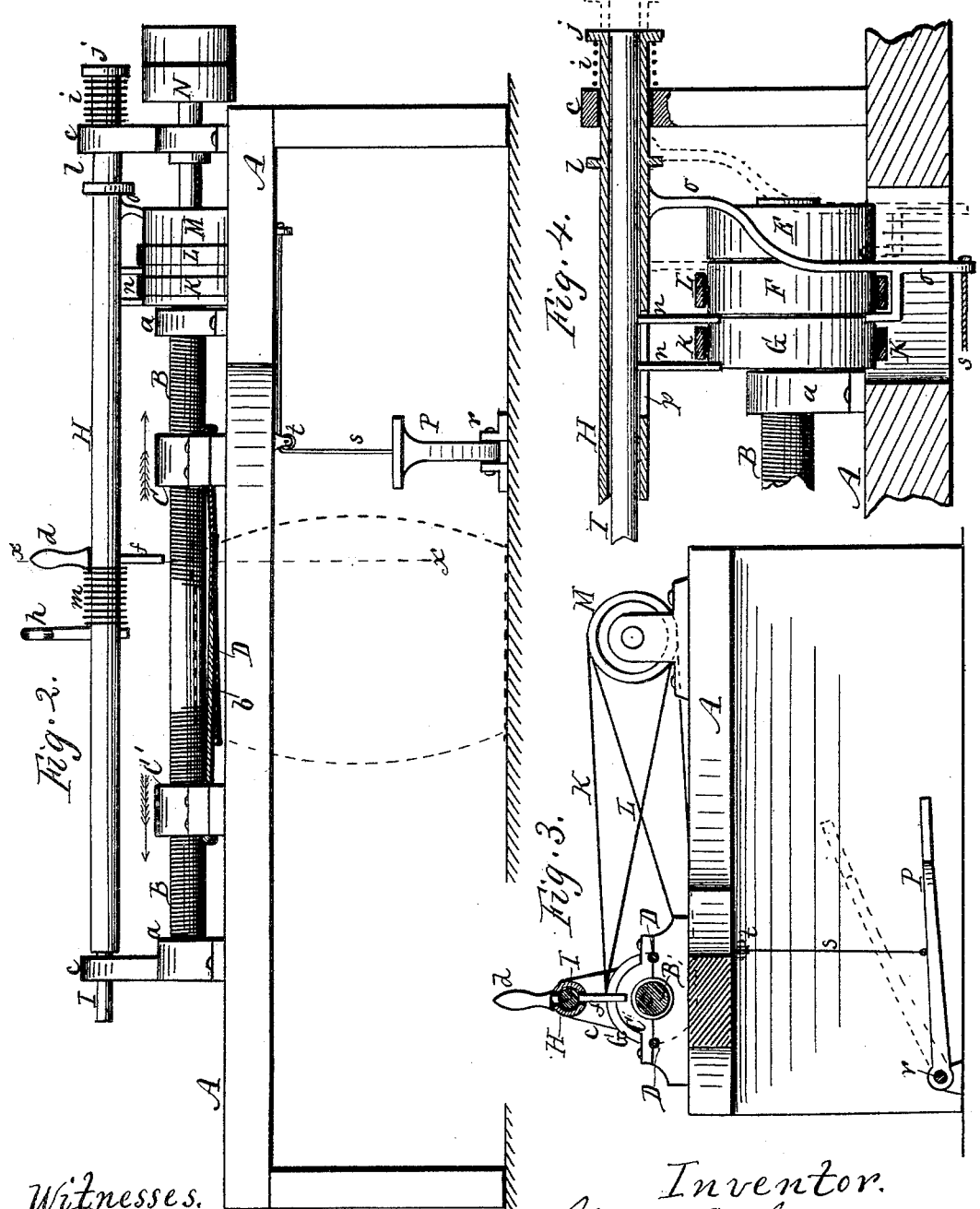

UNITED STATES PATENT OFFICE.

WILLIAM B. GEDDES, OF ROCHESTER, NEW YORK.

MACHINE FOR WINDLASSING AND TRUSSING BARRELS.

SPECIFICATION forming part of Letters Patent No. 437,686, dated October 7, 1890.

Application filed April 14, 1890. Serial No. 347,891. (No model.)

*To all whom it may concern:*

Be it known that I, WILLIAM B GEDDES, of Rochester, in the county of Monroe and State of New York, have invented a certain new and useful Improvement in Machines for Windlassing and Trussing Barrels; and I do hereby declare that the following is a full, clear, and exact description of the same, reference being had to the drawings accompanying this application.

My improvement relates to a windlassing and trussing machine in which a cable formed into a loop is placed around the end of the barrel and drawn up to tighten the staves by means of a right-and-left screw which acts upon nuts to which the ends of the cable are attached.

The invention consists of means by which the apparatus is thrown into and out of gear by the use of a treadle, as hereinafter described and claimed.

In the drawings, Figure 1 is a plan view of the machine. Fig. 2 is a front elevation looking in the direction of the arrow in Fig. 1. Fig. 3 is a vertical cross-section in line $xx$ of Fig. 2. Fig. 4 is a diagram showing a longitudinal section of a portion of the two shafts and the table, and an elevation of the pulleys on which the belts run and are shifted. Fig. 5 is an enlarged cross-section of the two shafts and the operating-screw in line $xx$ of Fig. 2. Fig. 6 is a sectional side elevation of Fig. 5.

A indicates the frame, which may be of any desired construction.

B is a right-and-left screw-shaft mounted in bearings $a$ $a$ on top of the frame and extending longitudinally of the same.

C C′ are two slides forming nuts on the screw-shaft and resting on top of the bed of the frame. These slides approach toward or recede from each other according to the direction in which the screw-shaft is revolved D is a wire cable or cord attached at opposite ends of the slides. The drawings show two of such cables, the machine in that case being double-acting and two barrels being windlassed or trussed at one and the same time. The barrel is set upright, as indicated by dotted lines in Fig. 2, and the cable, when slacked, is formed into a loop $b$, which is placed around the top of the barrel. Then when the cable is drawn tight the top of the barrel is drawn together sufficiently to drive the head in place, after which it is drawn still tighter to receive the hoops on the outside.

E, F, and G are three pulleys mounted on one end of the screw-shaft B. The middle pulley F is made fast to the screw-shaft and the latter revolves with it; but the two end pulleys E and G turn loosely on the shaft, the object of which will be presently explained.

H and I are two shafts, resting one inside the other, supported in end bearings $c$ $c$ and located some distance above the screw-shaft B. Each of these shafts has an independent end movement. At a suitable position the interior shaft I has a handle $d$, projecting upward, and a pin $f$, projecting downward through slots $g$ $g$ of the outer shaft, said slots being of sufficient length for the proper end movements of both shafts. The outer shaft H also has a stem $h$, projecting upward, formed with hooks at the upper end, on which the coils or loops $b$ $b$ of the cables D D can be hung out of the way in applying and removing the barrels or at any time when not in use. $i$ is a spring resting on the outer right-hand end of the exterior shaft H, between the bearing $c$ and a shoulder $j$ on the end of the shaft, the tendency of which is to throw said exterior shaft to the right; but the motion is limited by a stop $l$ on the shaft inside the bearing $c$. $m$ is a similar spring on the exterior shaft H, resting between the stem $h$ of said shaft and the handle $d$ of the inner shaft, the tendency of which is to throw the inner shaft also to the right; but the movement is limited by reason of the handle $d$ striking the end of the slot $g$ of the outer shaft.

K and L are two bands that run on the pulleys E F G at one end and on a single long driving-pulley M at the other end, said pulley M being driven either by a pulley N by power or by a crank by hand. The band K is a straight band; but the band L is crossed, as shown in Fig. 1. $o$ is a shifter consisting of a metallic loop attached to the exterior shaft H, projecting down and embracing the band L, and shifting the same from the outside pulley E to the middle pulley F, or vice versa, according to the direction in which the shaft H is thrown. $n$ is a similar shifter attached to the interior shaft I, projecting downward through a slot $p$ in the interior shaft and embracing the other band K and shifting said band from the outside pulley G to the middle pulley F, and vice versa, as said inner shaft is thrown.

P, Fig. 3, is a treadle turning on a shaft or pivot $r$ and standing in convenient position to receive the foot of the operator. $s$ is a cord attached to the treadle, extending up over a pulley $t$ and thence to the lower end of the shifter $o$, to which it is attached. By pressing down on the treadle the exterior shaft H will be drawn to the left, and by releasing the treadle said shaft will be again thrown to the right by the spring $i$.

In operation a barrel is placed in position, the loop of the cable is thrown over it, and the treadle is then pressed down, which throws the exterior shaft H to the left and shifts the band L from the outer loose pulley E to the middle fast one F, consequently giving motion to the screw-shaft B and moving the slides C C' apart. This tightens the top of the barrel. The same movement of the exterior shaft is imparted to the interior one, which shifts the band K from the middle pulley to the other loose pulley G, and the band then runs free. As soon as the proper tension has been applied to the barrel the treadle is released, which shifts band K to the pulley F and the band L to the pulley E, thus reversing the motion of the screw-shaft B and causing the slides C C' to approach each other. At the end of a given motion of the slide C it strikes the downwardly-projecting pin $f$ of the interior shaft, draws said shaft endwise against spring $m$, and shifts the band K back to the loose pulley G, leaving the other band L also running on the loose pulley E, and the machine is then stopped and remains inactive till the foot is pressed on the treadle again. By this means the machine is automatic under the action of the treadle, first compressing the barrel, then slackening the cable, and finally stopping for the removal of the barrel and the insertion of another.

In this machine it will be noticed that the machine can be stopped at any moment by simply taking the foot from the treadle. Therefore the staves can be drawn up to any degree of tension and then held stationary. This is a very great advantage, as it prevents any undue pressure and obviates the danger of crushing the barrel or breaking the staves.

In ordinary windlassing-machines now in use there is no means of stopping the machine at any given point, but the pressure goes on to the full end of the stroke and the barrels are frequently broken or crushed.

Having described my invention, what I claim as new, and desire to secure by Letters Patent, is—

1. The combination of a right-and-left screw-shaft, nuts forming slides resting thereon and operated thereby, a cable attached at opposite ends to the nuts, a treadle, two shafts, each having independent end motion, shifters attached to the shafts, and a cord connecting the treadle with the shifters to reverse the motion of the screw-shaft, as herein shown and described.

2. The combination of a right-and-left screw-shaft, three pulleys on the shaft, one fast with the shaft, the other two loose thereon, two bands changeable on the pulleys, two endwise-movable shafts pressed in one direction by springs and drawn in the opposite direction by a treadle, and shifters on the shafts, engaging with the bands for changing them on the pulleys, as herein shown and described.

3. The combination of a right-and-left screw-shaft, nuts resting thereon, a cable attached at its opposite ends to the nuts, a treadle, two shafts carrying shifters connected with the treadle by a cord, three pulleys on the screw-shaft, one fast thereto, the others turning thereon, two bands connected with the shifters and changeable on the pulleys, and a pin projecting from one of the shafts so as to be intercepted by one of the nuts in retracting to stop the machine, as herein shown and described.

4. The combination, with a right-and-left screw, nuts on the screw, and a cable connected with the nuts and operated by shifting bands, of two shafts connected with the bands by shifters, one of said shafts having a pin projecting in the path of one of the nuts, whereby when the pin is struck by the nut the bands will be shifted to stop the machine, as described.

In witness whereof I have hereunto signed my name in the presence of two subscribing witnesses.

WM. B. GEDDES.

Witnesses:
   R. F. OSGOOD,
   JOSEPH GEDDES.